Patented May 15, 1951

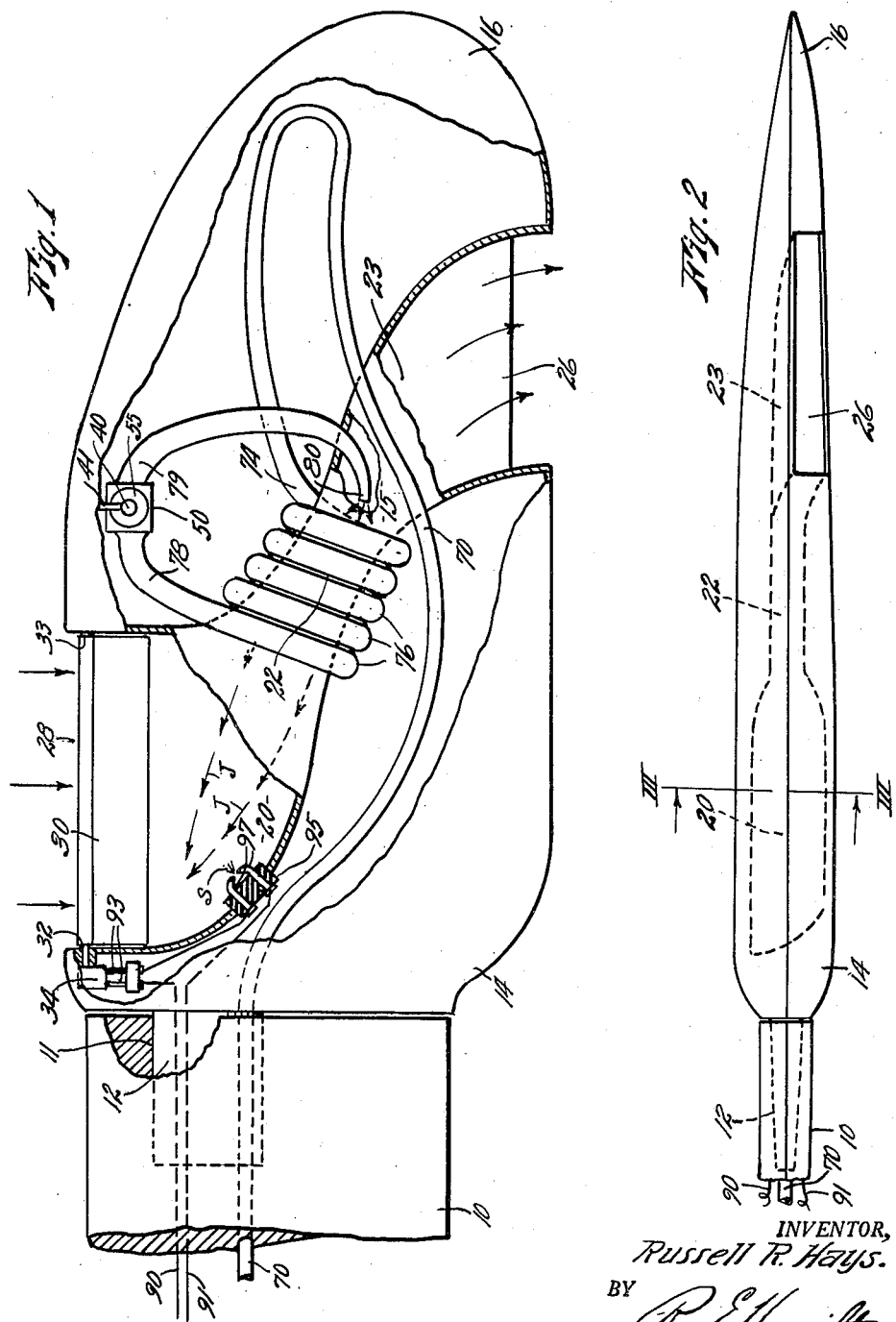

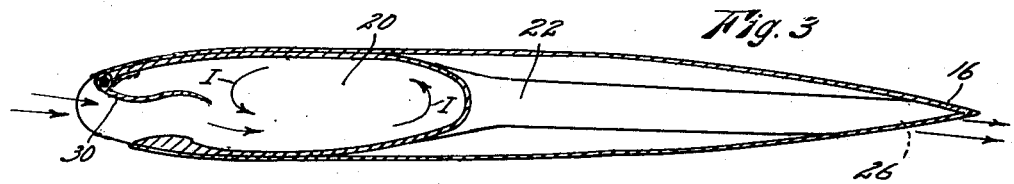
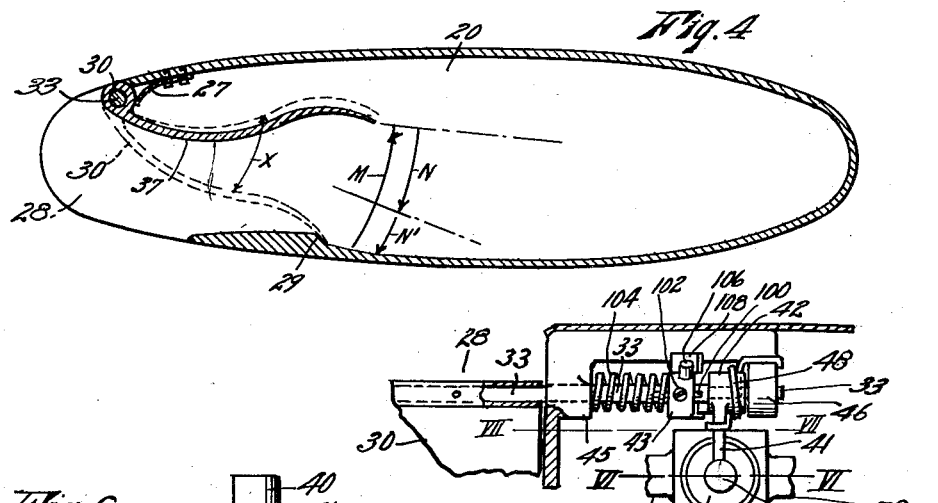
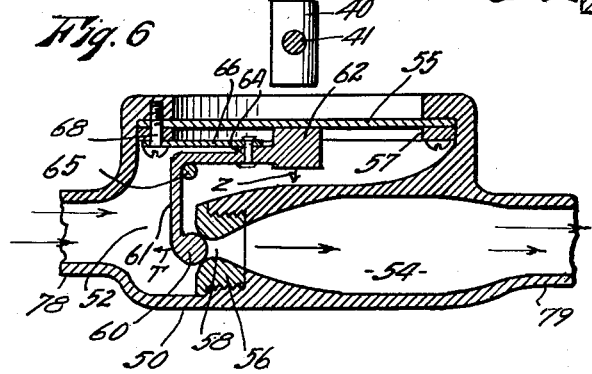
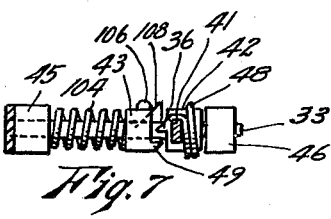

2,553,253

UNITED STATES PATENT OFFICE 2,553,253

JET PROPULSION ENGINE

Russell R. Hays, Lawrence, Kans.

Application March 5, 1945, Serial No. 581,047

6 Claims. (Cl. 170—135.4)

This invention relates to jet propulsion engines for aircraft and more particularly to such engines when mounted at the tip of the blades of aircraft having rotating blade systems.

Such an engine is especially suited for propulsion at the tips of propeller blades since the latter's high peripheral speed provides a high velocity airstream for driving fresh air into the combustion chamber of the engine and because the efficiency of the higher velocity exhaust jet is greater when the translational speed of the engine approaches this velocity.

In designing such an engine three general types of adaptation of the basic principle of such an engine are met with. These are, first, the building of a small compact engine; second, the utilization of the particular advantages to be obtained by mounting the engine on such a rapidly revolving structure; and third, adaptation of the engine to the aerodynamic and structural requirements of the rotor blade, to permit efficient functioning of the rotor and to permit its conversion to autorotative flight in event of failure of the engines.

Assuming these requirements to be satisfactorily met, the basic principle involved is one of utilizing a high velocity airstream passing through a tube having a restricted center section to cause fluttering of a weighted flap mounted at the inlet port and thus to alternately open and close the entrance of this tube. Movement of this flap is synchronized with the opening and closing of a fuel valve which injects preheated fuel gases under high pressure into the restricted center section of the tube coincident with closing of the inlet port by the flap and in a direction opposed to the movement of the airstream thereby creating pressure and heating of the air trapped in the forward section of the tube during admixture with the injected fuel gases, and facilitating their ignition by an electric spark also synchronized with the movement of the flap closing the inlet port.

Adapting the design of such a jet propulsion engine to fit snugly within the confines of an airfoil section involves considerations not met with in more conventional forms. Yet this is necessary since conversion of a lifting propeller to an autorotating blade system necessitates the elimination of any cumbersome structure imposing a large drag when not in operation as a jet engine. A compact arrangement following the general form of an ordinary blade tip is obviously desirable. Accordingly, the accepted cylindrical form of the combustion chamber has been flattened and canted with respect to the longitudinal axis of the blade with the result that the exhaust tube lies more nearly adjacent the tip of the blade and opens from beneath its trailing edge, whereas the shutters comprising the air intake valve of the combustion chamber are incorporated in the blade's leading edge.

In attaining these ends, the objects of this invention may be stated broadly as:

1. Provision of jet propulsion engine in which the airstream through the combustion chamber is momentarily reversed in direction by high pressure injection of fuel to pressures sufficient to permit efficient burning of the resultant gas air mixture.

2. Provision of a jet propulsion engine in which a fluid fuel held under high pressure is heated to a gaseous state by the heat of the engine in a container retaining fluid under pressure in its bottom and gas under pressure in its top, and a valve for drawing off the gaseous fuel from the top of the container for feeding into the combustion chamber of the engine.

3. Provision of an intermittently acting valve for high pressure gases which is alternately opened and closed by means of percussion so that the inside of the valve structure may be sealed to prevent leakage.

4. Provision of a weighted shutter for closing the intake orifice of a jet engine which is waved in cross-section to provide periodic motion or fluttering in response to air forces created by the airstream passing through the combustion chamber.

5. Provision of a timing mechanism for a jet propulsion engine which is operated by a flutter flap on the intake orifice of the combustion chamber by which fuel injection and the firing spark are synchronized with the firing and exhausting of the spent gases from the combustion chamber.

6. Provision of controlled turbulence in the combustion chamber of a jet engine by means of the arrangement of the air inlet and fuel inlet orifices so that the air for recharging the combustion chamber circulates irrotationally adjacent the containing walls of the chamber while the fuel injected into the chamber follows the low pressure area at the center of the circulating airstream and moves transversely to the direction of irrotational movement of the latter so that uniform mixing and ignition of the fuel and gas charge is facilitated.

7. Provision of a pressure differential between the inlet orifices and the exhaust orifices of a jet propulsion engine so that exhausting of spent gases from, and the drawing of fresh air into the combustion chamber is facilitated; in this instance the means for doing so being the placing of the exhaust port of the engine at a radially greater distance from the center of the rotor blade than is the inlet port.

8. Provision of a jet propulsion engine for rotary wing aircraft which is shaped to fit within the confines of an enlarged rotor blade tip so that it will offer a minimum of drag when not in operation and permit conversion of the blade system to autorotative flight in event of the jet engine's failure during flight.

Ancillary objectives such as the simplification of the valve structure and the timing of the percussion means used to open it, sealing flanges for the combustion chamber and the like will be apparent from reading the following description taken in conjunction with the accompanying drawings, in which:

Fig. 1 is a diagrammatic plan view of a jet propulsion engine embodying this invention with parts broken away.

Fig. 2 is a side elevational view looking toward the trailing edge of the engine structure as seen in Fig. 1.

Fig. 3 is an enlarged cross-sectional view taken along line III—III of Fig. 2 looking in the direction of the arrows and illustrating the irrotational movement of the fresh air entering the combustion chamber.

Fig. 4 is an enlarged cross-sectional view of the combustion chamber as shown in Fig. 3 with parts omitted and showing the travel of the inlet flutter flap in timing the operation of the engine.

Fig. 5 is an enlarged plan view of the fuel feed valve and associated parts with parts shown in section.

Fig. 6 is an enlarged sectional view taken on line VI—VI of Fig. 5.

Fig. 7 is a sectional view taken on line VII—VII of Fig. 5.

Referring to the figures, the tip of a horizontally disposed lifting propeller blade 10 has the butt 12 of the jet propulsion engine unit 14 solidly fixed in the recessed portion 11 at the end of the blade. In exterior form the unit 14 is substantially a light metal airfoil somewhat larger in cross section than the blade 10 to which it is fixed and is reduced down in section at the tip in keeping with conventional practice. The unit is built around a jet engine 15, the central axis of which is obliquely disposed to the longitudinal axis of the unit 14, with the air inlet slot 28 opening on the leading edge of the unit and adjacent its butt and the exhaust slot 26 opening beneath the trailing edge of the unit and adjacent the tip 16. The engine 15 is built of light heat resistant steel or alloy and the body of it consists of three parts; an oval combustion chamber 20, the outer end of which is reduced down in cross-section to form the throat of a venturi 22 which expands into an exhaust tube 23 compressed and curved to form an exhaust slot 26.

A flap or shutter 30 mounted on aligned pivots 32 and 33 journaled in the leading edge of the unit and above the air inlet port 28 has the reversed curve form in cross-section shown in Fig. 4 so that it sets up a fluttering movement through an angle X in response to the passage of air through the combustion chamber 20 of the engine, being arrested in its downward movement by the step 29 forming the lower lip of the entrance slot 28 at which time it closes the inlet slot 28, and being damped in its upward travel by the force resultant to the airstream passing over the curved inner face 37 of the shutter. This flutter flap is made of relatively heavy material so that it is in effect weighted and consequently has a greater tendency to maintain its natural frequency than would be the case were it made of lighter material. To prevent leakage around the hinge of the flap, a spring shoe 27 fixed to the upper wall of the combustion chamber rides on the rounded hinge section 30, and has a turned back tip so that compression in the chamber 20 will serve to more effectively seal it.

The inner end of shutter pivot 32 carries a cam 34 which contacts points 93 of the ignition cable 90, thereby closing the circuit between cables 90 and 91 which extend out through the blade 10, during the lower phases of flapping of the shutter 30 producing a firing spark S between the points 97 of the insulated inset 95 passing through the wall of the combustion chamber 20. The end portion of shutter pivot or shaft 33 extends through the spaced apart bearings 45 and 46 and carries a hammer 40 having its arm 41 terminating in a hub 42 that is bored to operatively fit and freely rotate on the reduced outer end portion of pivot 33. This hub is positioned between bearing 46 and a shoulder on pivot 33 to secure it against longitudinal movement on the pivot. A coil spring 48 wound about hub 42 with its one end portion engaging the hammer arm 41 and its other end engaging the bearing member 46 serves to normally maintain the hammer in its lowered position. The inner face of hub 42 is provided with a ratchet tooth 36 which is adapted to be engaged by a driving ratchet tooth 49 which is integral with a sleeve 43 slidably mounted on pivot 33 for oscillatory movement therewith. Pivot 33 is grooved at 100 to receive the end of set screw 102 to permit longitudinal movement of sleeve 43 on the pivot. A compression spring 104 positioned between sleeve 43 and bearing 45 serves to urge ratchet tooth 49 in engagement with tooth 36. The hammer 40 is adapted to be raised as the shutter valve is caused to open by the action of incoming air. When the hammer has reached a predetermined height, it must be released to permit a downward blow to operate the fuel feed as hereinafter described.

The releasing movement of the driving ratchet 49 is produced by a transverse lug 106 on the periphery of sleeve 43 engaging a cam face 108 integral with bearing 46 which forces sleeve 43 against the compression of spring 104 whereby driving ratchet 49 is moved out of engagement with ratchet tooth 36, thus permitting gravity and the compressed spring 48 to force the hammer head 49 downwardly to contact the diaphragm 55 of the fuel valve 50.

The fuel line 70 passing from a suitable container, up through the hub of the propeller and hence down the inside of blade 10 in a conventional manner, enters the engine unit 14 through the butt 12 and is carried through the engine housing to the tip 16 of the unit where it is looped backwards to enter the enlarged preheating line 74 wrapped around the engine venturi in preheating coils 76 for conversion of the liquid fuel carried by it to preheated gas under the same pressure as the fuel contained in the line 70. This gas is conducted to the fuel valve 50 by the line 78 extending from the inner end of preheating coils 76, and passed intermittently through valve 50, passes into the line 79 which passes through the wall of the Venturi tube 22 and projects into the throat of the venturi to form a jetting orifice 80 which discharges directly into the Venturi throat toward the combustion chamber 20.

The high pressure intermittent valve 50 consists of an entrance chamber 52, Fig. 6, and an exhausting chamber 54 connected by the Venturi shaped port 58 in the steel cap 56. The spherical shaped valve 60 made of material slightly softer than the steel cap 56 seats in the mouth of the venturi 58 and is held in a closed position by the pressure differential of the gases passing through the port 58 during normal operation. In order that the valve may be opened to permit passage of gaseous fuel through it, it is fixed to an arm 61 which is bent through a 90° angle about the pin 65, solidly fixed in the wall of the entrance chamber 52, and extends outward to form the handle of a small anvil 62 contacting the center of the inner face of the heavy circular diaphragm 55, being held in this position by the flat metal strip 66 riveted to step 64 adjacent the anvil 62 at its outer end and fixed to the entrance chamber wall 52 by screws 68 at its other end. Diaphragm plate 55 is fixed in a suitable recess by ring 57 to prevent leakage of gas and to permit very limited distortion by reason of the pressure differential effective upon it. The purpose of this diaphragm is to permit transmission of shock loads imposed by striking of the hammer 40 at the center of its outer face to the anvil 62 resting against its inner face, the force thus imparted acting to swing anvil 62 through the arc Z and consequently raise the valve 60 through the arc T and opening the port 58. In this instance, centrifugal force acts to close the valve 60, but an equivalent spring member might easily be substituted.

In operation, jet fuel such as gasoline in the line 70 is put under an initial pressure by suitable means, and since gravity acting on the anvil in the direction Z during static conditions opens the valve 60, gasoline passes into the Venturi throat 22. The flap 30 is raised and fuel ignited to preheat the engine unit in the same fashion that a blow torch is put into operation. When the preheating coils 76 have been heated sufficiently to convert the liquid fuel to a gas, flaps 30 are closed, the pitch of the propeller blades decreased to give zero attack angles, and small auxiliary engine or electric motor mounted in the fuselage of the machine upon which the propeller is mounted is used to bring the propeller up to its normal rotational speed. The prerequisites to the successful operation of such an engine, whether it be at the tips of a rotor blade or operated statically, are that the fuel be initially placed under pressure, heated to generate a high pressure gas, and that the velocity of the airstream entering the entrance slot of the combustion chamber be sufficient to induce flapping movement of the timing flap.

Having achieved these prerequisites, the starting and operation of the engine is automatic. Air is initially drawn through the engine by the pressure differential created through the ramming action of the airstream against the outer side of the inlet flap 30 and the suction created at the exhaust port 26 effective against the inner side, acting to raise the flap. Because of its waved cross-section two aerodynamic forces acting transverse to the airstream are effective upon this flap. The first is a pressure differential at its trailing edge tending to raise it. The second is a reverse differential due to the curvature of its forward face tending to close it. Hence, given an upward impetus by the force at its tip, its inertia carries it upward out of the range of this differential at which time the opposite differential becomes effective to urge it downward. This action alone would not suffice to close the port, but taken in conjunction with the high pressure injection of fuel gases momentarily stopping the airflow and eliminating the pressure differential at the flap tip, the flap's inertia carries it on down against the closing stop 29, at which time compression arising by reason of the fuel injection effectively holds it shut.

The synchronization of these operations is achieved by properly positioning the release means for the hammer which times the striking and stroke of the valve hammer 40 against the valve diaphragm 55 with respect to the movement of the flap 30, allowance being made for the lag in the operation of the fuel valve in opening so that injection of fuel into the combustion chamber occurs during the phase N' of the flap's downward movement N as illustrated in Fig. 4. Simultaneously with the injection of fuel gases the cam 34 contacts the points 93 to produce a firing arc S at the inner end of the combustion chamber.

Mixing of the gases and carrying of a fuel air mixture to the firing spark are hastened by the oval design of the combustion chamber 20 and the fact that the airstream entering the chamber along its side is initially deflected downward by the flap 30 causing it to follow the walls of the chamber in its movement toward the venturi 22 in a whirling irrotational cross-sectional pattern which produces an area of reduced pressure in its center as illustrated in Fig. 3. The high pressure fuel gases injected from the orifice 80 on the other hand, first spread to block the throat of the venturi 22 and entering the combustion chamber 20 follow the lower pressured central area in the cone J—J of Fig. 1 being admixed with the retained air by the swirling movement thereof. During this mixing, heat transfer to the trapped air takes place from three sources; namely, retained heat on the walls of the combustion chamber, from the preheated fuel gases, and compression resultant to the latter's injection. The resultant expansion adds in turn to the initial compression at which time ignition by the arc S occurs producing a sudden rise in pressure in the combustion chamber and forcing the burned gases through the venturi 22 which is no longer blocked by the jet of injected fuel from orifice 80 and hence these gases are forced through the exhausting tube 23 and are expelled from the exhaust slot 26 at the trailing edge of the unit.

The reaction on the engine unit being measured by the mass times the velocity squared of the ejected gases, a propulsive effect occurs tending to produce rotation of the propeller upon which the unit is mounted. As operation of the engine or engines continues, the starting motor is disengaged and the pitch of the propeller blades increased to their normal flight position. Since numerous adaptations of the basic principle embodied in this invention may be made, what is claimed is:

1. In a jet propulsion engine, a combustion chamber, an air inlet valve of reversed camber cross-sectional form for said chamber, a liquid fuel source, means for placing said source under pressure including preheat means associated with said combustion chamber, a restricted orifice leading from said chamber, a fuel injection line mounted to force preheated gaseous fuel under pressure into said combustion chamber from said restricted orifice, a fuel igniting means mounted in said combustion chamber, and means for synchronizing the injection of said fuel with the closing of said air inlet valve.

2. In a jet propulsion engine, a combustion chamber, an air inlet valve of reversed camber cross-sectional form for said chamber, a hammer carried by said inlet valve, a liquid fuel source, means for placing said source under pressure, a restricted orifice leading from said chamber, a preheating coil associated with said chamber for converting liquid fuel under pressure to gaseous fuel, a percussion operated high pressure valve operatively associated with said hammer, a fuel injection line mounted to force preheated gaseous fuel under pressure into said combustion chamber from said restricted orifice, a fuel igniting means mounted in said combustion chamber, and means for synchronizing the injection of said fuel with the closing of said air inlet valve.

3. In a jet propulsion engine, a combustion chamber having a slotted inlet port, an inlet valve operative in said inlet port, said valve being hinged at one side and having a reversed camber cross-sectional form whereby opposed aerodynamic differentials induced by the passage of air through said combustion chamber alternately urge the trailing edge of said inlet flap in opposite directions, a fuel line to said combustion chamber including preheat means associated with said combustion chamber, a high pressure fuel valve synchronized with movement of said inlet valve for injecting preheated high pressure fuel gases into said combustion chamber, and an ignition means synchronized with movement of said inlet valve for firing the resultant air and fuel mixture.

4. In a jet propulsion engine having a combustion chamber, an inlet port to said chamber, a reversed camber cross-sectional form valve for said port, and a restricted opening leading from said chamber, a fuel source, a fuel line from said source to said chamber including; a high pressure fuel injection nozzle mounted in said restricted opening, means for inducing a high velocity airstream through said chamber, and means synchronized with said valve and said nozzle for injecting said fuel into said chamber from said opening with closing of said inlet port by said valve, whereby a higher pressure is produced in said combustion chamber than in said restricted opening.

5. In a jet propulsion engine having a combustion chamber, an inlet port to said chamber, and an exhaust port of smaller cross-section than the cross-section of said chamber, means for inducing a high velocity airstream through said chamber, means for increasing the preignition pressure of an air and fuel mixture in said chamber including a high pressure fuel injection line leading to said engine and a reversed camber cross-sectional form valve pivoted on the inlet to said chamber, a hammer mounted on the hinge of said valve, a preheating coil in said line mounted on said engine, a percussion operated high pressure valve associated with said hammer in said line, an injection nozzle at the end of said line communicating with the inside of said chamber, and fuel igniting means mounted inside of said chamber and means connected with said air valve for operating said igniting means synchronously with said pressure valve.

6. In a jet engine mounted on a helicopter blade tip, a fluid fuel supply conduit to said engine inside of said blade, a preheating coil at the end of said conduit, and a fluid trap comprising a loop in said conduit extending past said preheating coil into the tip of said blade, whereby gases generated in said preheating coil are prevented from flowing back from said conduit into said blade.

RUSSELL R. HAYS.

REFERENCES CITED

The following references are of record in the file of this patent:

UNITED STATES PATENTS

| Number | Name | Date |
| --- | --- | --- |
| 826,502 | Hanson | July 17, 1906 |
| 1,021,521 | Héroult | Mar. 26, 1912 |
| 1,519,444 | Fales | Dec. 16, 1924 |
| 1,820,946 | Pitcairn | Sept. 1, 1931 |
| 1,897,092 | Weir | Feb. 14, 1933 |
| 2,054,081 | Holzwarth | Sept. 15, 1936 |
| 2,142,601 | Bleecker | Jan. 3, 1939 |
| 2,371,687 | Gerhardt | Mar. 20, 1945 |
| 2,380,969 | King | Aug. 7, 1945 |
| 2,432,213 | Rutishauser | Dec. 9, 1947 |
| 2,446,266 | Cummings | Aug. 3, 1948 |
| 2,462,587 | Wilcox | Feb. 22, 1949 |
| 2,474,359 | Isacco | June 28, 1949 |

FOREIGN PATENTS

| Number | Country | Date |
| --- | --- | --- |
| 409,379 | France | Feb. 17, 1910 |
| 412,478 | France | May 3, 1910 |
| 47,909 | Netherlands | Mar. 15, 1940 |